United States Patent
Boulet D'Auria et al.

(10) Patent No.: US 9,784,398 B2
(45) Date of Patent: Oct. 10, 2017

(54) REINFORCEMENT STRIP FOR REPAIRING FLUID TRANSPORT PIPES

(71) Applicant: 3X ENGINEERING, Monaco (MC)

(72) Inventors: Stanislas Boulet D'Auria, Villefranche sur Mer (FR); Hacen Slimani, Nice (FR)

(73) Assignee: 3X Engineering, Monaco (MC)

( * ) Notice: Subject to any disclaimer, the term of this patent is extended or adjusted under 35 U.S.C. 154(b) by 0 days.

(21) Appl. No.: 14/908,208

(22) PCT Filed: Jul. 30, 2014

(86) PCT No.: PCT/IB2014/001413
§ 371 (c)(1),
(2) Date: Jan. 28, 2016

(87) PCT Pub. No.: WO2015/015277
PCT Pub. Date: Feb. 7, 2015

(65) Prior Publication Data
US 2016/0186909 A1  Jun. 30, 2016

(30) Foreign Application Priority Data

Jul. 30, 2013 (MC) .......................................... 2593

(51) Int. Cl.
*F16L 55/16* (2006.01)
*F16L 53/00* (2006.01)
*F16L 58/16* (2006.01)
*G01B 7/02* (2006.01)

(52) U.S. Cl.
CPC ............ *F16L 53/004* (2013.01); *F16L 53/008* (2013.01); *F16L 58/16* (2013.01); *G01B 7/02* (2013.01)

(58) Field of Classification Search
CPC .................................................... F16L 55/168
USPC .............. 138/99, 97; 156/293, 294; 219/535
See application file for complete search history.

(56) References Cited

U.S. PATENT DOCUMENTS

| | | | |
|---|---|---|---|
| 4,797,604 A | 1/1989 | Rocci et al. | |
| 5,632,307 A * | 5/1997 | Fawley | F16L 55/1686 138/97 |
| 5,988,224 A | 11/1999 | D'Auria | |
| 6,334,465 B2 | 1/2002 | D'Auria | |
| 7,267,739 B2 * | 9/2007 | Blackmore | E03F 3/06 138/97 |

(Continued)

FOREIGN PATENT DOCUMENTS

| EP | 1710484 | 10/2006 |
|---|---|---|
| FR | 73579 | 8/1960 |

(Continued)

*Primary Examiner* — Patrick F Brinson
(74) *Attorney, Agent, or Firm* — James C. Lydon

(57) ABSTRACT

A reinforcement strip (20) suitable for repairing a fluid transport pipe (10) during which the strip is wound, under traction, around the portion of the pipe where the repair needs to be made at the same time that a crosslinking resin is applied to the strip in such a way as to form a sleeve around the portion to be repaired. The reinforcement strip includes at least one integrated metal wire, the electrical properties of the wire being used for operations including crosslinking the resin, detecting the portion of the pipe that includes the sleeve or detecting repaired portions of the pipe that have increased in diameter due to a thinning of the wall of the pipe.

7 Claims, 3 Drawing Sheets

(56) References Cited

U.S. PATENT DOCUMENTS

| | | | |
|---|---|---|---|
| 7,370,676 B2 | 5/2008 | D'Auria et al. | |
| 7,635,007 B2 | 12/2009 | D'Auria et al. | |
| 8,507,832 B2* | 8/2013 | Gueugnaut | B29B 13/024 |
| | | | 138/98 |
| 8,978,709 B2 | 3/2015 | D'Auria | |
| 2004/0016467 A1* | 1/2004 | Blackmore | F16L 55/179 |
| | | | 138/99 |
| 2004/0231789 A1 | 11/2004 | Blackmore et al. | |
| 2006/0272724 A1* | 12/2006 | Borland | F16L 55/175 |
| | | | 138/99 |
| 2011/0139351 A1 | 6/2011 | Morton | |
| 2011/0284115 A1* | 11/2011 | Venero | F16L 55/1686 |
| | | | 138/99 |

FOREIGN PATENT DOCUMENTS

| | | |
|---|---|---|
| FR | 1448060 | 8/1966 |
| FR | 2664184 | 1/1992 |
| WO | 2009133404 | 11/2009 |

\* cited by examiner

REINFORCEMENT STRIP FOR REPAIRING FLUID TRANSPORT PIPES

TECHNICAL FIELD

The present invention relates to the repair of pipes used to transport fluids such as petroleum and particularly relates to an improved reinforcing tape for repairing fluid transport pipes.

STATE OF THE ART

Repairing a fluid transport pipe such as a pipe used to transport petroleum, when it is deteriorated, always involves the installation of a reinforcing tape around the part of the pipe that is deteriorated. This reinforcing tape is generally made of flexible material having very good tensile mechanical properties such as high breaking strength. Such a material is preferably Kevlar (trademark) of the aramid family of fibres or glass fibre.

In reference to FIG. 1, a part of the pipe 10 whose walls 12 are generally made of steel, has a deteriorated portion 14 on its periphery. To repair this, the deteriorated part is first plugged with a polymeric resin. Then, a sleeve 16 is installed that covers the deteriorated part. Such a sleeve consists of a reinforcing tape wrapped around the pipe and covered with a crosslinking resin as the reinforcing strip is wrapped.

A sleeve 16 may also be installed on a portion of a pipe 10 that presents a thinned part 18 as a result of deterioration inside the pipe, as shown in FIG. 2.

FIG. 3 shows how the reinforcing tape is installed. The start of the tape 20 is first secured to the pipe by any suitable means. The reinforcing tape is then wrapped under tension around the pipe while overlapping a part of the preceding winding with each revolution, generally half the width of the reinforcing tape.

Unfortunately, the majority of pipes used to transport petroleum in particular are buried in the ground and this presents many drawbacks.

Thus, if the pipe passes through a territory exposed to low winter temperatures, application of the crosslinking resin is not easy insofar as the polymerisation enabling the resin to have good adhesion, chemical and mechanical characteristics can only take place correctly at a sufficient temperature of at least 10° C.

To overcome this problem, the pipe is usually covered with a heating blanket after the tape, impregnated with the ingredients of the resin, has been applied so as to initiate the polymerisation process. In this case, heat is conveyed from the outside inwardly, and a thin layer of condensation is thereby created at the interface between the pipe and the first layer of impregnated tape. This results in poor adhesion which adversely affects the mechanical and chemical efficiency of the repair and, moreover, produces a layer of rust.

Furthermore, in order to check the operation and condition of the pipe at regular intervals, every 3 years for example, the inside of the pipe is inspected using a tool called an instrumented pig that moves along inside the pipe.

However, when the repaired pipe is buried, the location of the repair is not known. When the instrumented pig is at the location of the repaired part, it indicates that the wall is damaged, but is unable to detect that it has been repaired. Consequently, the instrumented pig indicates that a repair must be made after unearthing the pipe, which represents an unnecessary and very costly operation.

Finally, when the pipe has become deteriorated, externally or internally, the thinning of the deteriorated part, that evolves over time, results in an increase of the pipe's inside diameter, despite a repair having been carried out by the installation of a sleeve. This increased thinning can be very dangerous as the wall of the pipe may crack if the diameter reaches an excessive value, unless a new sleeve is installed at this location.

DISCLOSURE OF INVENTION

This is why the purpose of the invention is to provide a reinforcing tape to repair a pipe used to transport fluid which makes it easy to carry out operations such as the installation of a sleeve, the detection of the part of the pipe equipped with the sleeve or the detection of parts of the pipe that have increased in diameter due to thinning of the pipe wall.

The main object of the invention is therefore a reinforcing tape suitable for repairing a fluid transport pipe wherein the tape is wound under tension around the portion of the pipe where the repair is to take place while, at the same time, a cross-linking resin is applied to the tape so as to form a sleeve around the portion to be repaired. The reinforcing tape includes at least one metal wire embedded in the longitudinal direction of the tape, the electrical properties of the wire being used for operations involving the crosslinking of the resin, the detection of the portion of the pipe comprising the sleeve or the detection of repaired portions of the pipe that have increased in diameter due to wall thinning.

Another object of the invention is a method for repairing a deteriorated portion of a pipe wherein a sleeve installed on the portion includes a reinforcing tape, mentioned above, including applying an electric voltage to the metal wire embedded in the tape so as to induce a temperature rise due to Joule heating in order to achieve a minimum temperature, for example 10° C., required to initiate polymerisation of the crosslinking resin applied to the tape.

Another object of the invention is a method for detecting a sleeve installed on a deteriorated portion of a pipe and including a reinforcing tape mentioned above, wherein an instrumented pig moves along inside the pipe and transmits a magnetic field, which enables a change to be recorded in the magnetic field due to the presence of the wire embedded in the tape so as to detect the sleeve and the repaired portion of the pipe.

Another object of the invention is a method for detecting an increase in diameter due to a thinning of the wall of a deteriorated portion of a pipe comprising a sleeve including a reinforcing tape mentioned above, wherein a voltage is applied between the ends of the metal wire embedded in the tape so as to measure the wire's resistivity, the variation of which is a function of the increase in the diameter of the pipe.

BRIEF DESCRIPTION OF FIGURES

The purposes, objects and characteristics of the invention will become more apparent from the following description when taken in conjunction with the accompanying drawings in which.

DETAILED DESCRIPTION OF THE INVENTION

Figure 1:
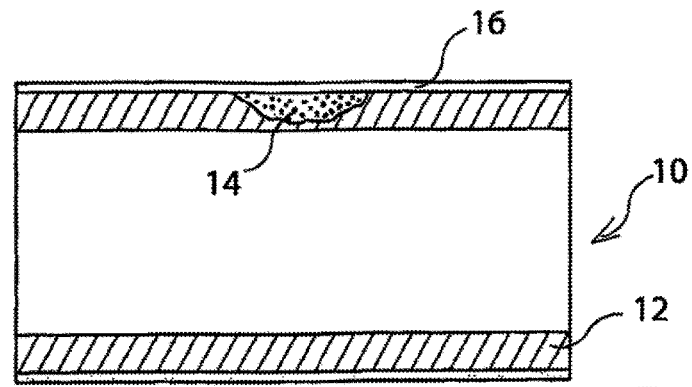
FIG. 1 represents a deteriorated exterior part of a pipe on which a repair was carried out by the installation of a sleeve.
Figure 2:
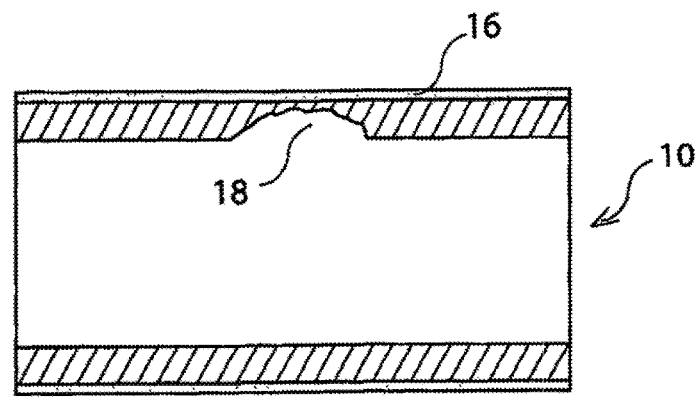
FIG. 2 represents a deteriorated interior part of a pipe on which a repair was carried out by the installation of a sleeve.
Figure 3:
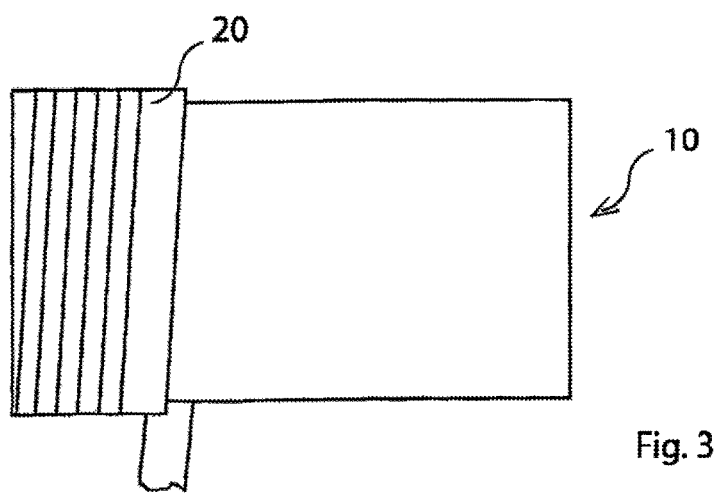
FIG. 3 represents the placement of a reinforcing tape on the deteriorated part of a pipe.

FIGS. 1 to 3, which relate to a pipe having a deteriorated portion for which the repair consists in installing a sleeve, have already been described in the prior art.

Figure 4:
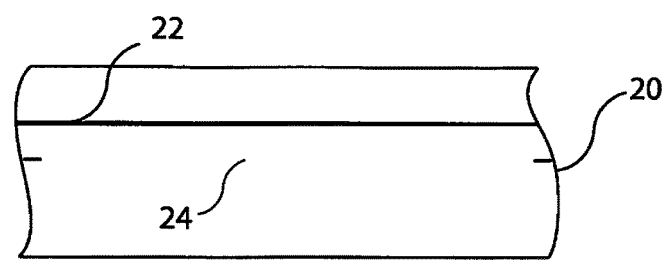
FIG. 4 schematically represents the reinforcing tape with the metal wire according to the invention.

In reference to FIG. 4, the reinforcing tape 20, which may be formed from several reinforcing tapes placed end to end, is comprised of a flexible material having very good tensile mechanical properties, such as Kevlar and comprises a metal wire 22, made of steel for example, embedded within the tape 20 in the longitudinal direction of the tape.

It should be noted that the reinforcing tape may comprise several metal wires. In this case, it is preferable that the wires all be located on the same side of the median line 24 so that a short-circuit cannot occur if the wire 22 is flush with the tape when the winding is partly covered (preferably in half) by the following winding (see FIG. 3).

Figure 5:
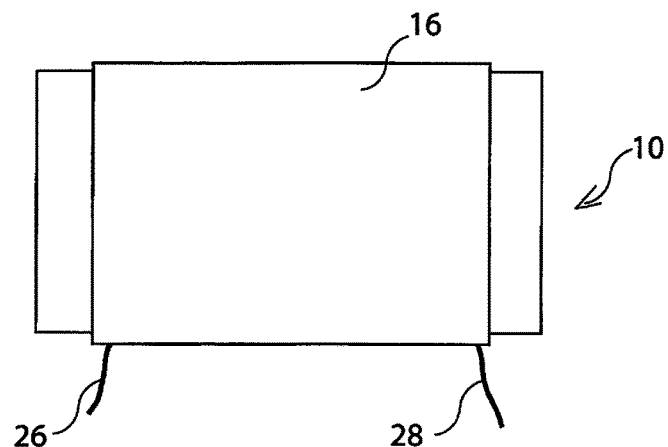
FIG. 5 represents the part of the pipe on which a sleeve has been installed with the ends of the metal wire protruding from the sleeve.

The pipe 10 with a sleeve 16 comprising a reinforcing tape according to the present invention is illustrated in FIG. 5. As seen in the figure, the ends 26 and 28 of the metal wire 22 protrude from the sleeve 16 so as to be accessible on the surface of the ground when the pipe is buried.

As already mentioned above, many pipes, and in particular pipes for transporting petroleum, are buried in territories where winter temperatures drop below zero. When the sleeve is installed, the reinforcing tape is covered with a crosslinking resin. This resin usually consists of two components that polymerise by crosslinking when in contact with air. This crosslinking does not occur, however, if the temperature drops below a minimum value, e.g. 10° C.

By using a reinforcing tape according to the invention, it is possible to overcome this drawback by applying a low voltage between the two ends 26 and 28 of the metal wire so that a current flows in the metal wire and thus create an increase in temperature by Joule heating until a minimum temperature is reached, e.g. 10° C., in order to initiate polymerisation of the resin.

As soon as the first reinforcing tape, impregnated with the resin components, has been wound onto the cold pipe, the operator applies voltage to it and can continue winding other tapes without worrying about the temperature of the pipe. This prevents condensation from forming.

Furthermore, once the wrapping is finished, while leaving the power on and protecting the pipe with an isothermal fabric, one simply waits for the right polymerisation temperature to be reached, which can be achieved using a visual indicator such as a heat-sensitive label. As a result, one can be sure that all layers (which may be up to 100, i.e. 50 mm thick) are perfectly polymerised.

Another advantage is the reduction of the waiting time before pressure can be reapplied. This waiting time, which is usually 72 hours (the time required for the resin to stabilise), can thus be shortened to a few hours, which corresponds to notable gains in terms of the cost price.

During installation of the reinforcing tapes, a minimum mechanical tension in the order of 6 kg, i.e. the force applied by a man, is required between 2 tapes, knowing that the tape is not elastic.

Owing to the presence of the wire (or wires) embedded in the tape, it is possible to see the difference between a slackly wrapped tape, i.e. with tension less than 6 kg, and a tightly wrapped tape, and thus to check if the operator has complied with the installation procedure. One simply has to measure the ohmic resistance of the tape before and after its installation, the difference between the two measures reflecting the tension during the wrapping process.

It should be noted that a required number of layers is calculated for a given repair, and thus a tape may reach a length of roughly hundred meters. Owing to the known resistivity of the wire, the resistance measurement indicates the total length of tape to be applied.

Figure 6:
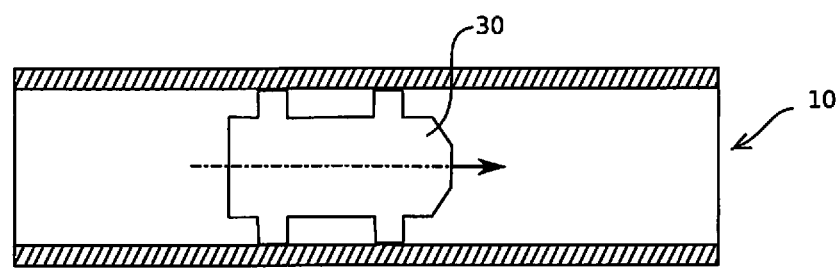
FIG. 6 is a cross-section illustrating an instrumented pig 30 inside pipe 10 and its direction of travel through the pipe.

When the pipe has been repaired, the pipe is then inspected with an instrumented pig 30 (see FIG. 6) which moves inside the pipe; the instrumented pig indicates that deterioration is present on the wall when it is located at the repaired part.

Owing to the metal wire embedded in the reinforcing tape, the instrumented pig detects the presence of the sleeve. The instrumented pig comprises a plurality of measuring means including means for measuring the magnetic flux of a magnet flowing through the wall of the pipe between the two poles of the magnet. Owing to the windings of the reinforcing tape, the metal wire embedded in the reinforcing tape forms a coil which modifies the magnetic flux measured. Consequently, it is easy to detect the presence of a sleeve which indicates that the pipe has already been repaired.

As was previously mentioned, when a repair has been performed following deterioration of the pipe, the thinning of the deteriorated part, even after repair, increases the diameter of the pipe, which can be very dangerous as the wall of the pipe may crack if the diameter reaches an excessive value unless a new sleeve is installed at this location. It is therefore necessary to regularly check that the diameter of the pipe at the location of the repair has not increased excessively to avoid irreparable cracking.

As the repaired portion of the pipe comprises a sleeve, an increase in the pipe diameter results in an increase in the diameter of the sleeve and therefore in the diameter of the turns formed by the metal wire embedded in the reinforcing tape, which thereby results in an increase in the length of the metal wire due to stretching. This increase in the length of the wire has the effect of increasing the resistivity of the wire. Consequently, to know the possible increase in the diameter of the pipe, one simply calculates the variation in resistivity of the wire by applying a voltage between the ends 26 and 28 of the wire (see FIG. 5) and measuring the resistance of the wire to know its resistivity.

The invention claimed is:

1. A reinforcing tape (20) suitable for repairing a fluid transport pipe (10) by wrapping said tape under tension around a portion of the pipe where the repair must be performed while, at the same time, a crosslinking resin is applied to form a sleeve (16) around said portion of the pipe;
   said reinforcing tape comprising several metal wires (22) embedded in a longitudinal direction of the tape, the electrical properties of said wires being suitable for use in operations involving crosslinking of said resin, detection of said portion of the pipe comprising the sleeve or detection of repaired portions of the pipe that have increased in diameter due to wall thinning,
   wherein said wires are embedded in only half of said tape such that, each time the tape is wrapped around the pipe, the half comprising the wires overlaps half-way the previous winding not comprising wires such that there can be no short-circuiting between the portions of wires of consecutive windings.

2. A method for repairing a deteriorated portion of a pipe (10) in which a sleeve (16) installed on said portion includes a reinforcing tape (20) according to claim 1, including applying an electric voltage to the metal wires (22) embedded in said tape so as to increase the temperature by Joule heating in order to reach a minimum temperature required to initiate the polymerisation of the crosslinking resin applied on said tape.

3. The method according to claim 2, wherein the ohmic resistance of the reinforcing tape (20) is measured before and after placement, the difference between the two measurements reflecting the mechanical tension applied during the wrapping process.

4. The method according to claim 2, wherein the resistance measurement of said embedded wires, the resistivity of which is known, allows the determination of the total length of the reinforcement tape (20) to be applied.

5. A method for detecting a sleeve (16) installed on a deteriorated portion of pipe (10) and including a reinforcing tape (20) according to claim 1, wherein an instrumented pig is moved along inside said pipe, said pig including a magnet producing a magnetic flux, which enables a modification of said magnetic flux to be recorded owing to the presence of the metal wires embedded in said tape so as to detect the sleeve and the repaired portion of the pipe.

6. A method for detecting an increase in the diameter owing to thinning of the wall of a deteriorated portion of a pipe (10) comprising a sleeve (16) including a reinforcing tape (20) according to claim 1, wherein a voltage is applied between the ends (26, 28) of the metal wires embedded in said tape so as to measure the resistivity of said wires, the variation of which is a function of the increase in the diameter of the pipe.

7. The method of claim 2, wherein said minimum temperature is 10° C.

* * * * *